United States Patent [19]

Curtila et al.

[11] Patent Number: 4,767,916

[45] Date of Patent: Aug. 30, 1988

[54] VERY HIGH TEMPERATURE HEATING ELEMENT

[75] Inventors: Robert Curtila, St. Martin le Vinoux; Daniel Tollens, Sassenage, both of France

[73] Assignee: Commissariat a l'Energie, Atomique, Paris, France

[21] Appl. No.: 68,883

[22] Filed: Jul. 1, 1987

[30] Foreign Application Priority Data

Jul. 8, 1986 [FR] France ................. 86 10239

[51] Int. Cl.$^4$ ............................................. H05B 3/10
[52] U.S. Cl. ...................................... 219/552; 219/553
[58] Field of Search ................... 219/552, 533; 264/63; 252/516; 429/17; 501/153

[56] References Cited

U.S. PATENT DOCUMENTS

| | | | |
|---|---|---|---|
| 3,749,882 | 7/1973 | Pilkington, Sr. et al. | 219/390 |
| 4,016,446 | 4/1977 | Cadoff | 313/218 |
| 4,020,134 | 4/1977 | Gorden et al. | 264/63 |
| 4,098,958 | 7/1978 | Bettman | 429/17 |

FOREIGN PATENT DOCUMENTS

| | | |
|---|---|---|
| 0010834 | 5/1980 | European Pat. Off. |
| 107511 | 5/1984 | European Pat. Off. |
| 1207440 | 2/1960 | France |
| 2299289 | 1/1976 | France |
| 1451952 | 10/1976 | United Kingdom |

Primary Examiner—E. A. Goldberg
Assistant Examiner—M. M. Lateef
Attorney, Agent, or Firm—Kerkam, Stowell, Kondracki & Clarke

[57] ABSTRACT

A heating element for producing very high temperature by the Joule effect comprising by a cylindrical $\beta$-alumina bar, in which is provided at least one recess containing at least one sodium salt.

8 Claims, 1 Drawing Sheet

VERY HIGH TEMPERATURE HEATING ELEMENT

BACKGROUND OF THE INVENTION

The present invention relates to a very high temperature heating element. Heat treatments carried out at temperatures close to 2000° C. are increasingly used. The furnaces and their heating elements are based on materials or ceramics which, with the aid of preheating, become electricity conductors and thus, after said initiation, constitute the resistive part indispensable for heating by the Joule effect. Such heating elements are e.g. described in French patent application No. 75 11335, filed in the name of the Commissariat à l'Energie Atomique on Apr. 11th 1975 now French Pat. No. 2,307,431.

The preheating temperatures necessary for initiating this phenomenon are approximately 1200° C. $\beta$-alumina (11 $Al_2O_3$, $Na_2O$) permits a much lower initiating temperature of close to 200° C. Thus, alumina B has $Na^+$ ions of a much more mobile nature, whose presence therefore contributes to lowering the initiating temperature and gives alumina interesting electrical properties. Thus, an initiating temperature of close to 200° C. can easily be achieved by conventional heating means, e.g. a hot air current or by using a resistor located within the ceramic heating element. However, a $\beta$-alumina heating element loses $Na^+$ ions over a period of time and as the temperature increases. Therefore its electrical properties deteriorate and the electric power and operating temperature decrease in a manner incompatible with normal usage.

SUMMARY OF THE INVENTION

The present invention relates to a means for maintaining constant the electrical properties of $\beta$-alumina. More specifically, the present invention relates to a heating element wherein it is constituted by an elongated cylindrical body of $\beta$-alumina in which is provided at least one recess containing at least one sodium salt. Preferably, the cylinder has a circular cross-section. The usable sodium salts can be chosen from the group of aluminates, phosphates, borates and carbonates. Preference is given to sodium carbonate ($Na_2CO_3$). As a result of said means, properties of $\beta$-alumina are retained throughout the mass and the material is then perfectly adapted to heating to temperature of approximately 2000° C.

According to a first variant, the heating element is produced in a $\beta$-alumina bar having at its end two longitudinal blind holes.

According to a second variant, the heating element is produced with the aid of a $\beta$-alumina tube.

According to a third variant, the heating element is produced with the aid of a $\beta$-alumina tube having at least one $\beta$-alumina cement plug placed inside the tube.

According to a preferred embodiment, the electric current supplies at the ends of the heated element are constituted by two longitudinal openings, in which are placed conductive springs integral with rigid parts. The rigid part - spring assemblies are fixed in the openings by a $\beta$-alumina cement. This structure protects against corrosion the hot part of the electrode and makes it possible to avoid fracture by differential expansion of the heating element and the current intakes.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
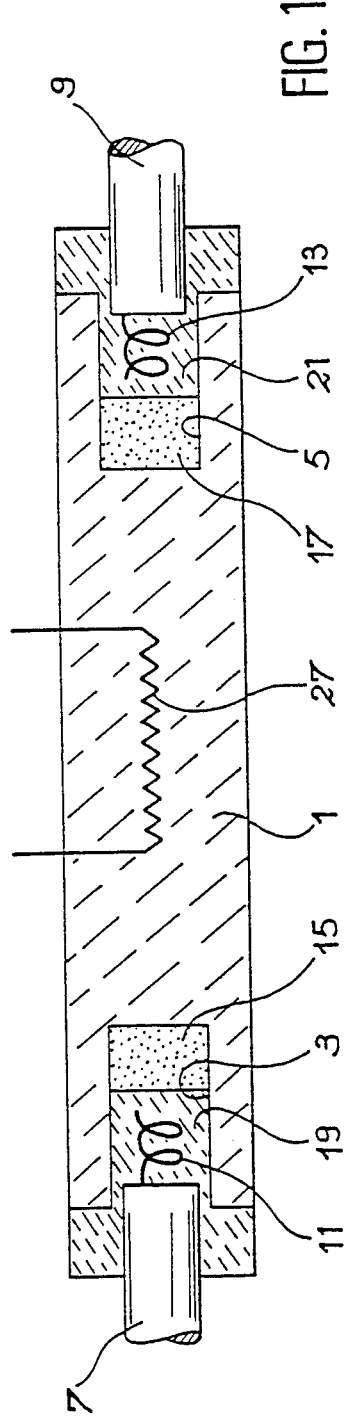
FIG. 1 a heating element produced with the aid of a $\beta$-alumina bar.

FIG. 1 shows a cylindrical $\beta$-alumina bar 1 having two blind holes 3,5 drilled in the ends thereof and in its longitudinal axis by using diamond drills, together with two current supplies 7,9 having two metal springs 11, 13.

The two metal springs 11, 31, joined to the rigid part of the current supplies 7, 9, avoid the fracture of the heating element at a temperature of approximately 2000° C. by differential expansion. Following the partial filling of at least one blind hole 3 and/or 5 with a sodium salt (preferably sodium carbonate) in order to constitute a reserve 15 and/or 17, assemblies formed by springs 11, 13 and the current supplies 7, 9 are maintained by $\beta$-alumina seals 19, 21 in the blind holes 3, 5, in such a way that springs 11, 13 are not in contact with the sodium salt.

Figure 2:
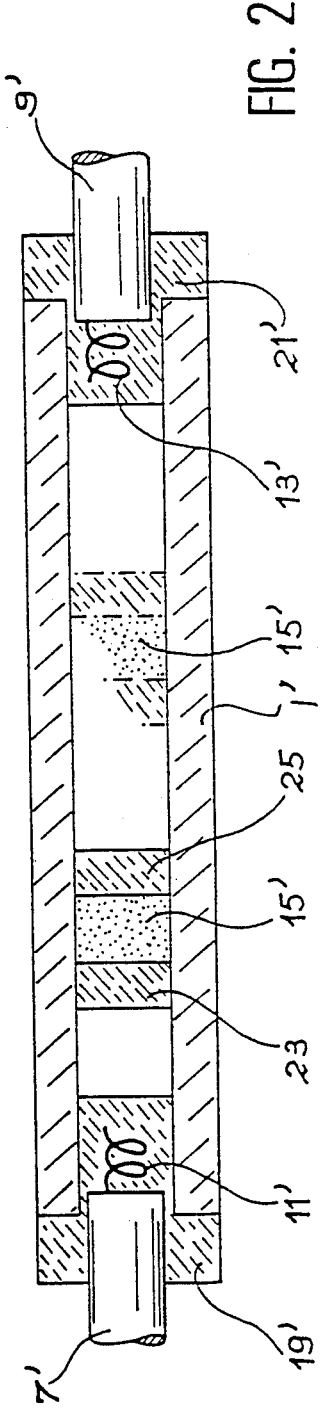
FIG. 2 a heating element produced with the aid of a $\beta$-alumina tube.

In FIG. 2, the heating element is constituted by a $\beta$-alumina tube 1', whose interal diameter makes it possible to receive at each of its ends an assembly constituted by a spring and a rigid part of the current supply 7', 9', 11' and 13'. A first plug 23 is formed with a $\beta$-alumina cement in tube 1'. A quantity of sodium salt 15' (preferably sodium carbonate) is then introduced into the tube in contact with plug 23. A second $\beta$-alumina plug 25 is made in order to define the volume of the sodium salt reserve 15'.

Several other plugs and successive sodium salt fillings can then be produced, if necessary. The assemblies formed by springs 11', 13' and the current supplies 7', 9' are then placed and held in tube 1' with the aid of the $\beta$-alumina cement-based seals 19', 21'. When the heating element is formed from a $\beta$-alumina tube 1', a quantity of sodium salt 15' (preferably sodium carbonate) is placed in tube 1' whose ends are sealed by the assemblies constituted by springs 11', 13' and current supplies 7', 9' sealed with the aid of a $\beta$-alumina cement. The sealing must prevent contact between the free ends of spring 11', 13' and the sodium salt. The heating element according to the invention has an initiating temperature close to 200° C. and this temperature can be achieved with the aid of a hot air current. It is also possible to provide a resistor, as indicated at 27 in FIG. 1. Resistor 27 is positioned and sealed in bar 1 beforehand and is appropriately machined for this purpose. Obviously tube 1' could also have such a resistor.

The heating element produced according to the invention makes it possible to obtain temperatures of 2000° C. For example, a heating element has been produced with the following characteristics:

length: 200 millimeters
supply voltage: 220 volts
intensity: 25 amperes
heating element temperature: 1700° C.
The life of this heating element exceeds 20,000 hours.
What is claimed is:

1. A heating element for producing a very high temperature using the Joule effect, comprising:
   (a) a β-alumina bar having at least one recess; and
   (b) at least one sodium salt disposed within said recess whereby said sodium salt acts as a reverse for sodium ions when said heat element is operating at very high temperatures.

2. The heating element according to claim 1, wherein said at least one sodium salt comprises sodium carbonate.

3. The heating element according to claim 1, wherein said at least one recess in said β-alumina bar comprises two longitudinal blind holes in the ends of said bar for receiving leads of the current supply.

4. The heating element according to claim 1, wherein said β-alumina bar further comprises a β-alumina tube.

5. The heating element according to claim 4 further comprising at least one β-alumina cement plug placed within said tube on either side of a mass of a sodium salt so as to contain said sodium salt within said tube.

6. The heating element according to claim 3, wherein said two longitudinal blind holes are adapted to receive current supply leads comprising conductive springs integral with rigid parts forming spring - rigid part assemblies, the assemblies being fixed in the openings by a β-alumina cement plug, whereby said β-alumina cement plugs insulate said conductive springs from said at least one sodium salt.

7. The heating element according to claim 1, wherein said β-alumina bar further comprises a resistor disposed within said bar for heating said bar to an initiating temperature of approximately 200° C.

8. The heating element according to claim 1, wherein said β-alumina bar comprises a cylinder.

* * * * *